(12) United States Patent
Zhang et al.

(10) Patent No.: US 10,208,606 B2
(45) Date of Patent: Feb. 19, 2019

(54) AIRFOIL FOR TURBOMACHINE AND AIRFOIL COOLING METHOD

(71) Applicant: Solar Turbines Incorporated, San Diego, CA (US)

(72) Inventors: Luzeng Zhang, San Diego, CA (US); Juan Yin, San Diego, CA (US); Hee-Koo Moon, San Diego, CA (US)

(73) Assignee: Solar Turbine Incorporated, San Diego, CA (US)

( * ) Notice: Subject to any disclaimer, the term of this patent is extended or adjusted under 35 U.S.C. 154(b) by 354 days.

(21) Appl. No.: 15/055,895

(22) Filed: Feb. 29, 2016

(65) Prior Publication Data

US 2017/0248022 A1    Aug. 31, 2017

(51) Int. Cl.
*F01D 5/18* (2006.01)
*F04D 29/58* (2006.01)
*F04D 29/32* (2006.01)
*F01D 25/12* (2006.01)
*F01D 9/04* (2006.01)
*F04D 29/54* (2006.01)

(52) U.S. Cl.
CPC ............ *F01D 5/187* (2013.01); *F01D 9/041* (2013.01); *F01D 25/12* (2013.01); *F04D 29/324* (2013.01); *F04D 29/542* (2013.01); *F04D 29/582* (2013.01); *F05D 2220/32* (2013.01); *F05D 2260/202* (2013.01); *F05D 2260/22141* (2013.01)

(58) Field of Classification Search
CPC ............ F01D 5/18; F01D 5/187; F01D 5/188
See application file for complete search history.

(56) References Cited

U.S. PATENT DOCUMENTS

| 5,813,836 A | 9/1998 | Starkweather |
| 6,126,396 A | 10/2000 | Doughty et al. |
| 6,695,582 B2 | 2/2004 | Bunker et al. |
| 6,974,308 B2 | 12/2005 | Halfmann et al. |
| 7,097,426 B2 * | 8/2006 | Lee .......................... F01D 5/187 |
| | | 416/96 R |
| 7,481,623 B1 | 1/2009 | Liang |
| 7,722,324 B2 * | 5/2010 | Cunha ..................... F01D 5/187 |
| | | 416/97 R |
| 8,231,349 B2 | 7/2012 | Naik et al. |
| 2010/0221121 A1 * | 9/2010 | Liang ..................... F01D 5/187 |
| | | 416/97 R |

* cited by examiner

*Primary Examiner* — Logan M Kraft
*Assistant Examiner* — John S Hunter, Jr.
(74) *Attorney, Agent, or Firm* — Mattingly, Burke, Cohen & Biederman

(57) ABSTRACT

An airfoil for a turbomachine such as a gas turbine engine includes a pressure side and a suction side, a flow-distributing forward wall and an inner cooling wall. A switchbacked passage extends through the airfoil, and the flow-distributing forward wall has a plurality of jetting orifices formed therein and connecting the switchbacked passage to a forward cavity. The jetting orifices are oriented to produce wall jets of cooling fluid directed in an upstream direction toward a back side of the leading edge. A second passage extends between the forward cavity and outlets of the airfoil, so as to convey cooling fluid in a downstream direction toward the outlets.

19 Claims, 3 Drawing Sheets

AIRFOIL FOR TURBOMACHINE AND AIRFOIL COOLING METHOD

TECHNICAL FIELD

The present disclosure relates generally to cooling an airfoil in a turbomachine, and more particularly to cooling an airfoil leading edge by way of discrete wall jets of cooling fluid.

BACKGROUND

Airfoils in the nature of vanes and blades are well-known components of turbomachines such as gas turbine engines. Airfoils may be used to direct flow of fluid through the turbomachine and/or impinged upon by fast moving gases to induce rotation of a compressor of the turbomachine or auxiliary equipment. In either case the service environment can be quite harsh, subjecting vanes, blades and the like to extreme temperatures.

A great many different cooling schemes for turbomachine components have been proposed over the years. In one well-known strategy for gas turbine engines a cooling fluid, such as compressed air from the engine's compressor, is conveyed into an interior of the airfoil and then discharged through openings in the airfoil body so as to provide a cooling "film" to cool surfaces of the airfoil. Other strategies attempt to cool the airfoil without generating a film as such but instead circulate the fluid through the airfoil and discharge it downstream near a trailing edge of the airfoil. United States Patent Application Publication No. 2010/0221121 to Liang is one such example.

SUMMARY

In one aspect, an airfoil for a turbomachine includes an elongate hollow body including an outer body wall having a pressure side and a suction side extending between a leading edge and a trailing edge, and a plurality of inner walls including a flow-distributing forward wall and an inner cooling wall. The elongate hollow body having formed therein a forward cavity defined in part by the flow-distributing forward wall and in part by the outer body wall, a switchbacked passage extending between an inlet and a plurality of outlets, for conveying a cooling fluid through the airfoil, and a second passage defined in part by the inner cooling wall and in part by the outer body wall. The flow-distributing forward wall having formed therein a plurality of jetting orifices fluidly connecting the switchbacked passage to the forward cavity, and oriented to produce wall jets of incoming cooling fluid from the switchbacked passage directed in an upstream direction toward a back side surface of the leading edge. The second passage extends between the forward cavity and the plurality of outlets, so as to convey outgoing cooling fluid from the forward cavity in a downstream direction toward the plurality of outlets.

In another aspect, a turbomachine includes a housing having a housing inlet and a housing outlet. An airfoil is within the housing and positioned in a flow path of fluid conveyed through the housing between the housing inlet and the housing outlet. The airfoil includes an outer body wall having a pressure side and a suction side extending between a leading edge and a trailing edge, and a plurality of inner walls including a flow-distributing forward wall and an inner cooling wall. The airfoil includes a forward cavity defined in part by the flow-distributing forward wall and in part by the outer body wall, a switchbacked passage extending between an inlet and a plurality of outlets, and a second passage defined in part by the inner cooling wall and in part by the outer body wall. The flow-distributing forward wall has formed therein a plurality of jetting orifices fluidly connecting the switchbacked passage to the forward cavity, and oriented to produce wall jets of incoming cooling fluid from the switchbacked passage directed in an upstream direction toward a back side of the leading edge. The second passage extends between the forward cavity and the plurality of outlets, so as to convey outgoing cooling fluid from the forward cavity in a downstream direction toward the plurality of outlets.

In still another aspect, a method of cooling an airfoil includes conveying a cooling fluid from a switchbacked passage extending through the airfoil into a plurality of jetting orifices fluidly connecting the switchbacked passage with a forward cavity positioned adjacent to a leading edge of the airfoil. The method further includes directing jets of the cooling fluid produced by the jetting orifices in an upstream direction toward a back side surface of the leading edge so as to dissipate heat of the leading edge. The method further includes directing the cooling fluid having dissipated heat of the leading edge in a downstream direction through a second passage defined by an outer body wall and an inner cooling wall of the airfoil, such that the cooling fluid dissipates heat of the outer body wall prior to discharging through a plurality of outlets of the airfoil.

BRIEF DESCRIPTION OF THE DRAWINGS

FIG. 2a is a detailed enlargement of a part of FIG. 2;

FIG. 2b is another detailed enlargement of another part of FIG. 2; and

DETAILED DESCRIPTION

Figure 1:
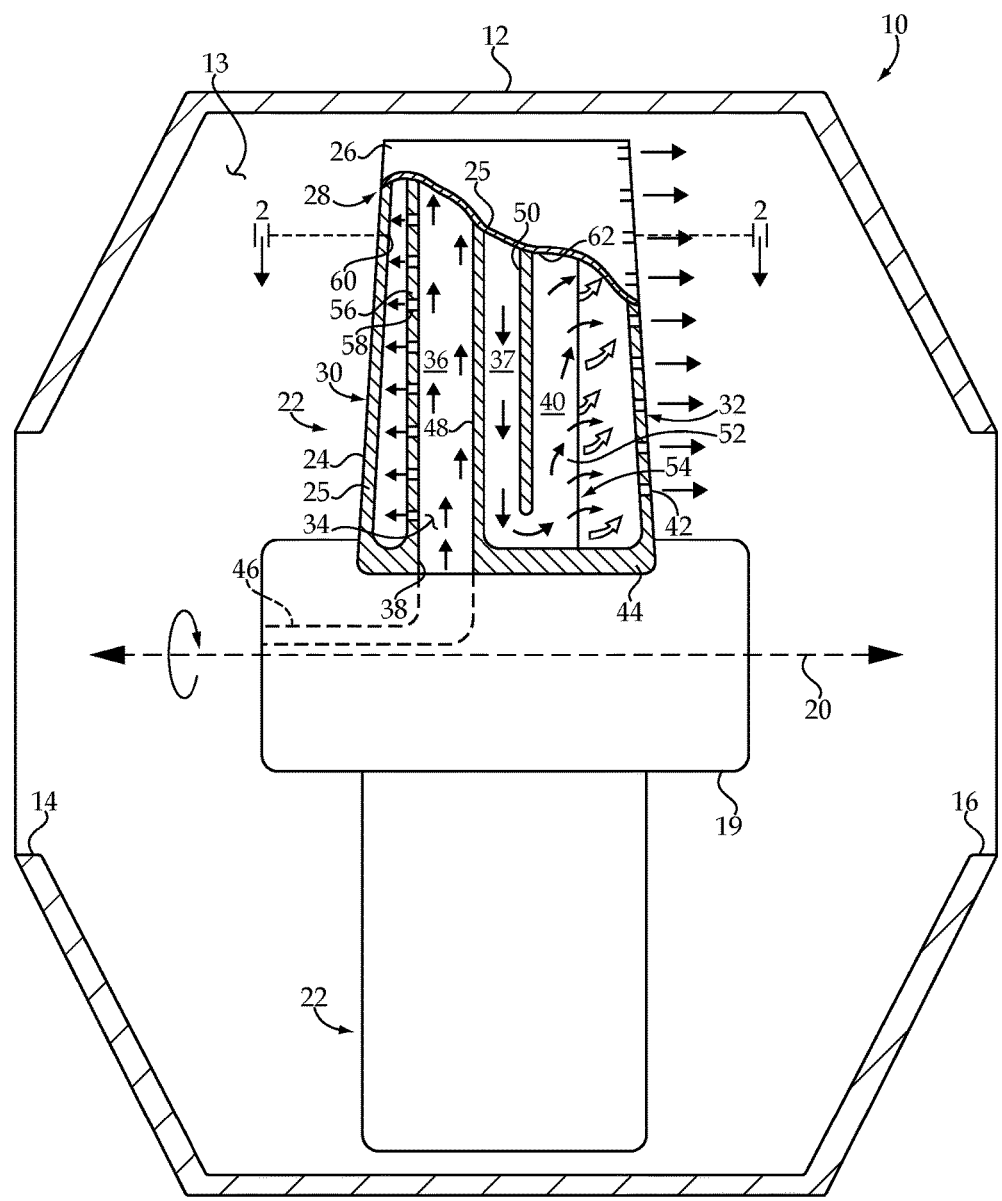
FIG. 1 is a partially sectioned side diagrammatic view of an airfoil within a turbomachine, according to one embodiment.

Referring to FIG. 1, there is shown a turbomachine 10 in the nature of a gas turbine engine, for example, and including a housing 12 having an inlet 14 and an outlet 16 formed therein. A fluid flow path extends through housing 12 between inlet 14 and outlet 16 and includes an internal housing space 13. A rotor 19 is positioned at least partially within space 13 and rotates about an axis 20. A plurality of airfoils 22, one of which is shown in sectioned view and discussed further herein, may have the form of turbine blades, and are mounted to rotor 19 and induced to rotate by way of impingement of gases conveyed through housing 12 in a well-known manner. Each airfoil 22, referred to hereinafter in the singular, may be coupled to rotor 19 by way of a root 44. A fluid conduit 46 may extend through rotor 19 and feeds cooling fluid such as compressed air from a compressor of turbomachine 10 through root 44 by way of an inlet 38 into airfoil 22. Those skilled in the art will be familiar with other turbomachine components not specifically illustrated in FIG. 1 but that would typically be part of a gas turbine engine such as engine 10, including a compressor driven by way of the rotation of rotor 19, ducting, fuel system components, and still others. In other embodiments, rather than a turbine blade airfoil 22 could be a stationary flow-directing vane, a compressor blade or still another structure in a gas turbine engine or other turbomachine. The subject gas turbine engine could be for aircraft, watercraft or land vehicle propulsion, electrical power generation, driving of a pump, a gas compressor or for any other application. As will be further apparent from the following description, airfoil 22 is uniquely and advantageously configured by way of internal structures and flow path geometry for cooling.

To this end, airfoil 22 includes an elongate hollow body 24 having an outer body wall 25 that is formed by a pressure side outer wall 26 and a suction side outer wall 28 each extending between a leading edge 30 and a trailing edge 32. Reference numerals 26 and 28 are used herein to refer to the respective outer walls of body 24, and also to the corresponding pressure side and suction side of body 24 and airfoil 22 itself. Body 24 has formed therein a switchbacked passage 34, for conveying a cooling fluid such as compressed air through airfoil 22. In a practical implementation strategy, switchbacked passage 34 includes an incoming segment 36 connected with a fluid inlet 38, and an outgoing segment 40 connected with a plurality of fluid outlets 42 formed in or adjacent to trailing edge 32. A middle segment 37 may connect incoming segment 36 with outgoing segment 40 so that switchbacked passage 34 has a serpentine form, switching back and forth in a spanwise direction within airfoil 22. In the illustrated embodiment, switchbacked passage 34 switches direction twice, although the present disclosure is not thereby limited. In other embodiments, a number of middle segments greater than one might be employed, or potentially no middle segment at all.

Body 24 further includes at least one inner dividing wall 48, 50, extending between incoming segment 36 and outgoing segment 40, an inner cooling wall 52 positioned in proximity to one of pressure side outer wall 26 and suction side outer wall 28, and a flow-distributing forward wall 56. In the embodiment shown, inner cooling wall 52 is in proximity to suction side outer wall 28 and closer to suction side outer wall 28 than to pressure side outer wall 26. Forward wall 56 may have formed therein a plurality of jetting orifices 58 fluidly connecting switchbacked passage 34 to a forward cavity 18 extending in a spanwise direction within airfoil 22. Forward cavity 18 is defined in part by forward wall 56 and in part by outer body wall 26, and may have a spanwise width, in and out of the plane of the page in FIG. 2, that is just slightly less than a spanwise width of airfoil 22. Jetting orifices 58 may be oriented to produce wall jets of incoming cooling fluid from switchbacked passage 34 directed in an upstream direction toward a back side surface 60 of leading edge 30. In a practical implementation strategy, jetting orifices 58 may have the form of slots spaced evenly, or at staggered locations, in the spanwise direction along forward wall 56 and directly adjacent to pressure side wall 26. Orifices 58 may be circular, oval, or still another shape, and will typically each have a length extending between passage 34 and cavity 18 that are greater than either of their height or width. In a further practical implementation strategy, orifices 58 may have the form of elongated slots that are narrower in width than in height, although the present disclosure is not thereby limited.

Figure 2:
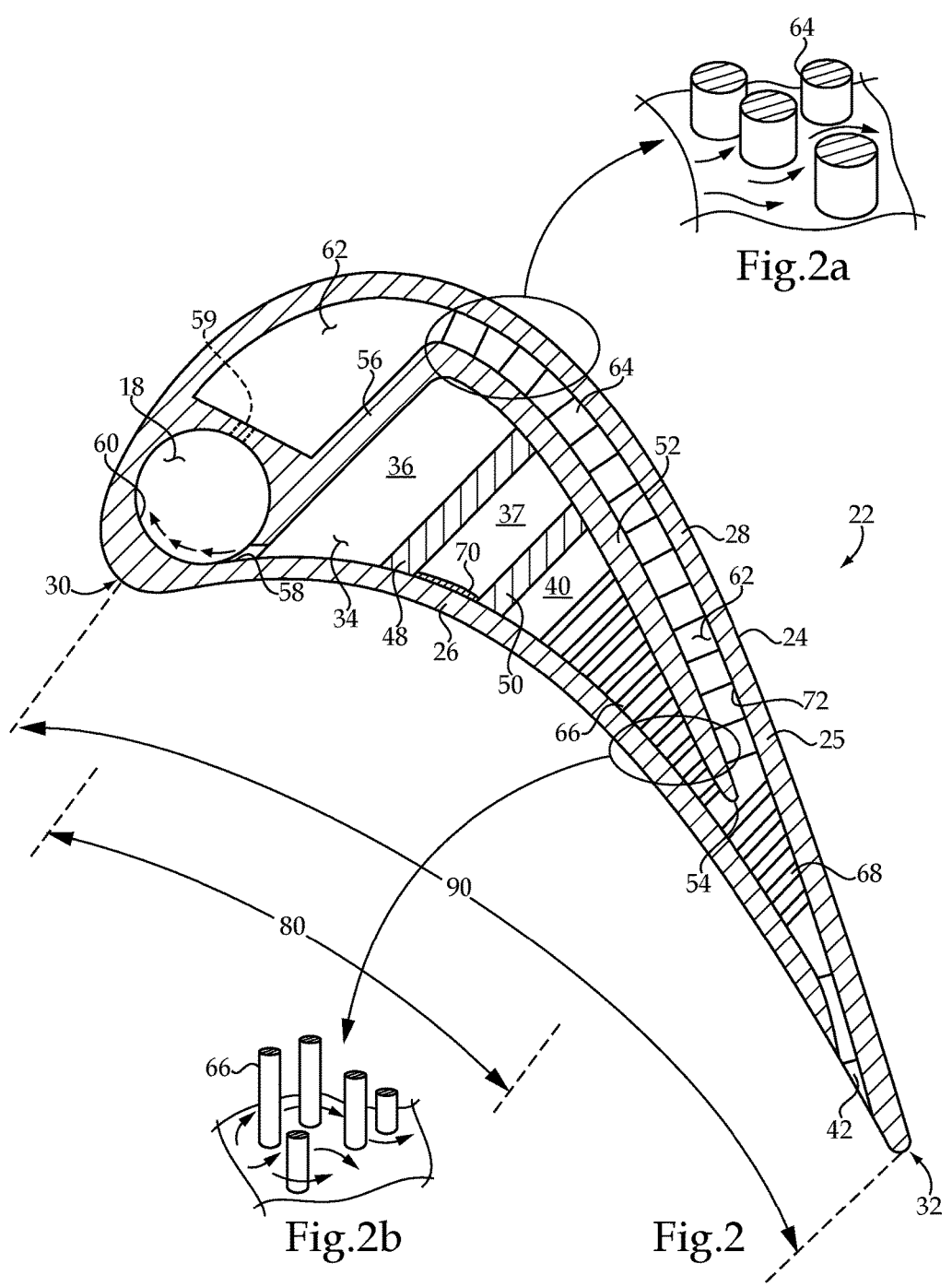
FIG. 2 is a sectioned view taken along line 2-2 of FIG. 1.

Referring also now to FIG. 2, as noted above forward cavity 18 extends in a spanwise direction between leading edge 30 and forward wall 56. It can be seen that leading edge 30 has a back side surface 60 including an arcuate profile. In the illustrated embodiment, forward cavity 18 has a generally circular profile such that an arc defined by back side surface 30 is a generally circular arc. Jetting orifices 58 may be oriented so as to direct wall jets of incoming cooling fluid from passage 34 along a trajectory of the arc defined by the arcuate profile of back side surface 60. In other embodiments described hereinbelow, an arc defined by the back side surface of a leading edge in an airfoil may have a different shape such as a generally parabolic shape. Arrows within cavity 18 in FIG. 2 illustrate a general trajectory of wall jets of cooling fluid from orifices 58. It will thus be appreciated that the wall jets themselves can be thought of as transitioning from a more or less flat or straight-line path smoothly into an arcuate path, following surface 60 up and around toward a top of cavity 18. A plurality of outlet orifices 59 may be formed between forward cavity 18 and a second passage 62, defined in part by outer body wall 25, in FIG. 2 suction side wall 28, and in part by inner cooling wall 52.

Inner cooling wall 52 thus forms second passage 62 with suction side outer wall 28, with second passage 62 extending between forward cavity 18 and outlets 42, so as to convey outgoing cooling fluid from forward cavity 18 in a downstream direction toward outlets 42. As used herein the terms upstream and downstream are used in reference generally to the streamwise directions that will be understood in connection with airfoil 22. As will be further apparent from the following description inner cooling wall 52 may be positioned, and airfoil 22 structured such that heat can be conducted directly from outer body wall 25 into inner cooling wall 52, and thenceforth to cooling fluid conveyed through passage 34. Outer body wall 25 may further include an inner surface, as illustrated in FIG. 2 a suction side inner surface 72, exposed to a flow of spent outgoing cooling fluid conveyed from forward cavity 18 to outlets 42 for discharging from airfoil 22. Such features are a contrast to certain known designs where inner cooling structures could receive heat conducted predominantly from cooling fluid and not from other structures of the airfoil.

Airfoil 22 may further include a first set of heat conductors 64 positioned at least partially within second passage 62 and extending between inner cooling wall 52 and suction side outer wall 26 so as to conductively couple inner cooling wall 52 with suction side outer wall 26. Airfoil 22 may also include a second set of heat conductors 66 positioned within outgoing segment 40 and extending between inner cooling wall 52 and suction side outer wall 28 so as to conductively couple inner cooling wall 52 with suction side outer wall 28. A plurality of trip strips 70 or the like, one of which is shown, may be positioned within passage 34 to induce mixing of cooling fluid conveyed through passage 34. Incoming segment 36 and middle segment 37 may be unobstructed, and thus free of pin fins or the like.

In a practical implementation strategy, a third set of heat conductors 68 may be provided and extend between suction side outer wall 28 and pressure side outer wall 26 to conductively couple together the same. Inner cooling wall 52 may be supported between pressure side outer wall 26 and suction side outer wall 28 by way of first and second sets of heat conductors 64 and 66. Inner cooling wall 52 may also include a back edge 54 that defines a confluence of passage 34 and passage 62. As best seen in FIG. 2, flows of cooling fluid having passed through passage 34 and passage 62, after having passed among heat conductors 66 and 64, respectively, and exchanged heat therewith, merge prior to discharging through outlets 42. Heat conductors 68 may also be located downstream from the confluence of passages 62 and 34. As illustrated in the detailed enlargement of FIG. 2a, heat conductors 64 may be oval in shape with the ovals oriented with their long axes to streamwise. Such heat conductors will be recognized by those skilled in the art as so-called pin fins. Other shapes and orientations, as well as combinations of shapes and orientations among the pin fins of any given set, are contemplated within the scope of the present disclosure.

It can also be noted from FIG. 2 that heat conductors 64 are generally uniform in size owing to the more or less uniform thickness or height of passage 62, at least for a majority of its streamwise length 80. Heat Conductors 66 and 68 may have lengths/heights that progressively decrease in a streamwise direction. Inner cooling wall 52 is closer to pressure side outer wall 26 for a majority, and in the illustrated embodiment an entirety, of streamwise length 80 than it is to suction side outer wall 28. It can also be seen that length 80 is equal to a majority of a streamwise length 90 of airfoil 22 between leading edge 30 and trailing edge 32. In the FIG. 2 version, a relatively abrupt transition between forward wall 56 and inner cooling wall 52 is evident, however, in other instances the two structures could smoothly transition one with the other, and could even be considered part of the same wall. Inner cooling wall 52 may have a spanwise width that is equal to a majority of a spanwise width of airfoil 22, and could be nearly equal to the total spanwise width of airfoil 22.

While no shrouding or the like is shown at an outboard end (not numbered) of airfoil 22, shrouding may be used. Cooling air may be discharged entirely from outlets 42, however, the present disclosure is not thereby limited and embodiments are contemplated where some of the spent air is discharged out of the outboard end, discharged through root 44, or still another strategy used. Airfoil 22 and other airfoils of the present disclosure will not typically be structured for film cooling. Thus, no cooling air will typically be discharged from airfoil 22 with the intention that the cooling air perform a substantial cooling function of the airfoil after discharging. Inner cooling wall 52, inner dividing walls 48 and 50, pressure side outer wall 26, and suction side outer wall 28 may have uniform thicknesses, and for that matter most or all of the walls of elongate hollow body 24 may have uniform thicknesses throughout airfoil 22.

As discussed above, and apparent from the drawing, in the embodiment of FIG. 2 inner cooling wall 52 is positioned relatively closer to suction side outer wall 28 than to pressure side outer wall 26. Among other features, this construction assists in enabling inner cooling wall 52 to conductively cool suction side outer wall 28. Heat conductors 64 can be sized and arranged such that heat of material forming suction side outer wall 28 is conducted directly and through the same material to inner cooling wall 52. It will be appreciated that heat conductors 64, 66, and 68, may all have distributions within their respective passages within airfoil 22, such that the cooling fluid through those passages is more or less uniformly conveyed past or among the corresponding sets of heat conductors. Heat from suction side outer wall 28 is thus conducted through heat conductors 64 into inner cooling wall 52, and from inner cooling wall 52 to cooling fluid traveling through passage 34 by way of heat conductors 66 as well as the surfaces of inner cooling wall 52 that are otherwise exposed to a flow of cooling fluid. Heat of inner dividing walls 48 and 50 may likewise be conducted into inner cooling wall 52.

Figure 3:
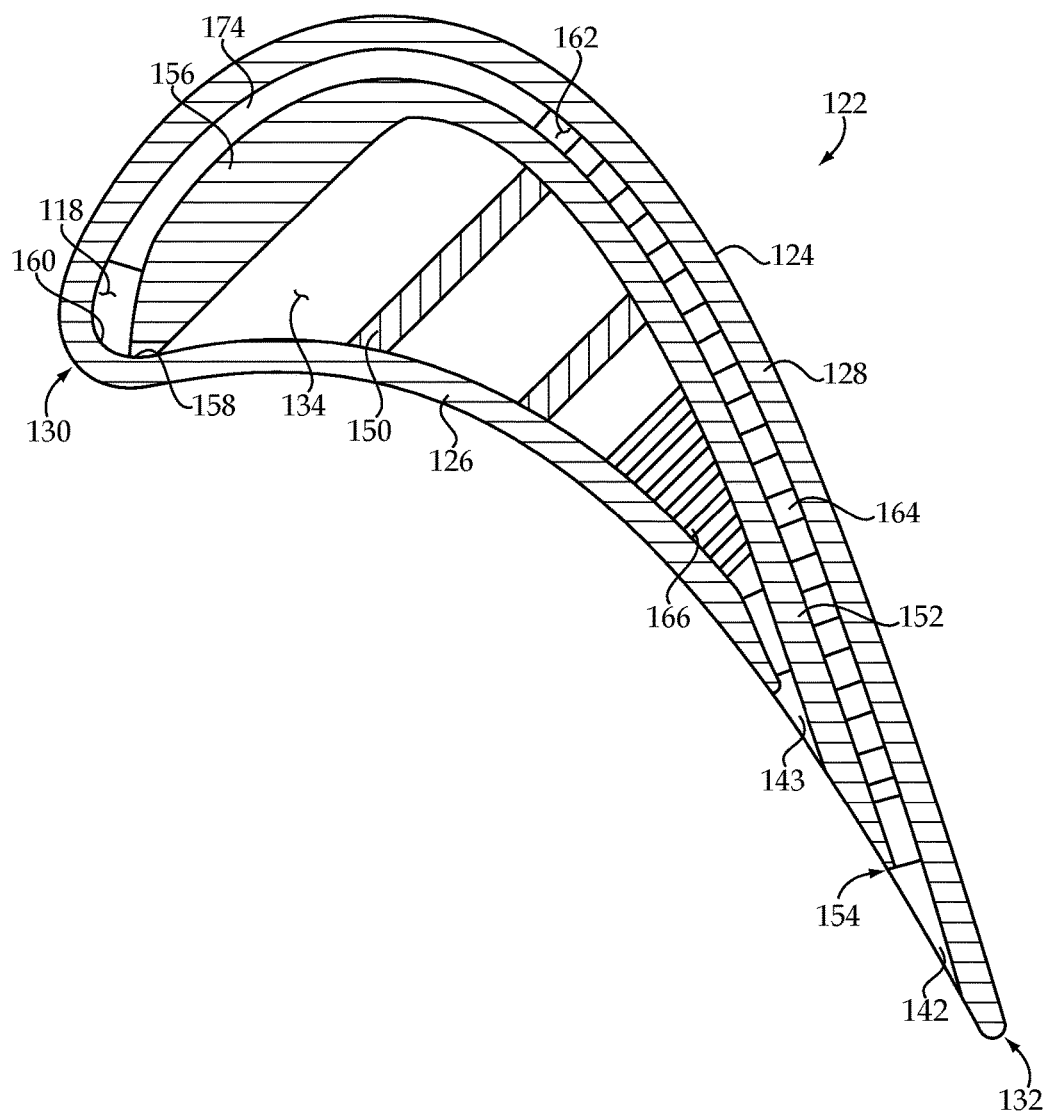
FIG. 3 is a sectioned view through an airfoil, according to another embodiment.

Referring now to FIG. 3, there is shown an airfoil 122 according to another embodiment. Airfoil 122 shares numerous features with airfoil 22, and the foregoing description will be understood to refer analogously to airfoil 122 apart from certain variations discussed hereinbelow. Airfoil 122 includes an elongate hollow body 124 having a pressure side outer wall 126 and a suction side outer wall 128. A switchbacked passage 134 extends through hollow body 124, and has a plurality of segments separated by a plurality of inner dividing walls 150. A forward cavity 118 extends in a spanwise direction through elongate hollow body 124, and a plurality of jetting orifices 158 are formed in a forward wall 156 and fluidly connect switchbacked passage 134 with forward cavity 118. Forward cavity 118 is defined in part by a back side surface 160 of a leading edge 130, and in part by forward wall 156. A second passage 162 is defined in part by suction side outer wall 128 and in part by inner cooling wall 152, and fluidly connects forward cavity 118 with a plurality of outlets 142 formed in or adjacent to a trailing edge 132. A plurality of ribs 174 are located within passage 62 and have streamwise orientations, being positioned between forward wall 156 and suction side outer wall 128. A first set of heat conductors 164 extends between inner cooling wall 152 and suction side outer wall 128, and a second set of heat conductors 166 extends between inner cooling wall 152 and pressure side outer wall 126. Heat conductors 164 and 166 may have configurations analogous to those of the heat conductors described with respect to the FIG. 2 embodiment.

In a practical implementation strategy jetting orifices 158 may have configurations generally the same as those of jetting orifices 58 in airfoil 22. In contrast to airfoil 22, in airfoil 122 a shape of forward cavity 118 and a shape of back side surface 160 is not circular but instead generally parabolic. Thus, it can be seen from FIG. 3 that forward cavity 118 has a generally parabolic profile in relevant part, and thus a shape of an arc defined by surface 160 is generally parabolic. Jets of cooling fluid from jetting orifices 158 will generally be directed along a path coinciding with a trajectory of the arc defined by the profile of the back side inner surface 160. In the case of airfoil 122 the arc is generally parabolic, in contrast to airfoil 22 where the analogous arc is generally circular. In either case, the jets are generally directed along and adjacent to the corresponding back side surface to dissipate heat from the same. Airfoil 122 further differs from airfoil 22 in that rather than merging flows of fluid through passages 134 and 162, the flows of cooling fluid are separately discharged from elongate hollow body 124 without mixing. A plurality of outlets 143 are formed in pressure side outer wall 126 and discharge cooling fluid from passage 134. Outlets 143 may be in alignment with outlets 142 in a spanwise direction, or may be at locations staggered with the locations of outlets 143. A back edge 154 of inner cooling wall 152 may thus form part of a periphery of outlets 142 as shown.

INDUSTRIAL APPLICABILITY

Referring to the drawings generally, in particular to the embodiment of FIG. 2 and by way of analogy also the embodiment of FIG. 3, during operation of turbomachine 10 a cooling fluid such as compressed air from a compressor rotated by way of the rotation of rotor 19 can be conveyed in a switchbacked pattern through a first passage in airfoil 22, namely, passage 34. Some of the cooling fluid is conveyed from passage 34 into jetting orifices 58, and thenceforth directed in the form of cooling fluid jets in an upstream direction toward back side surface 60 of leading edge 30 so as to dissipate heat of leading edge 30. The cooling fluid jetted into forward cavity 18 will generally travel in a swirl pattern about back side surface 60, and then turn generally in a downstream direction toward outlet orifices 59. Cooling fluid having dissipated heat of leading edge 30 will then generally travel in a downstream direction through passage 62 and dissipate heat of outer body wall 25, in the illustrated case suction side outer wall 28, prior to discharging through outlets 42.

In a practical implementation strategy, cooling fluid is conveyed from jetting orifices 58 into forward cavity 18, and into passage 62 without cross flow. In other words, airfoil 22 is structured so that the fresh cooling fluid provided for wall jet impingement cooling of back side 60 does not flow against, around, or across spent cooling fluid having already dissipated heat from back side surface 60, at least to any significant degree as compared with certain known designs. Mixing of fresh cooling fluid and spent cooling fluid is thus minimized, resulting in improved efficiency and reduced fluid mass flow requirements for a given cooling efficacy. Heat conducted into airfoil 22 from hot combustion gases flowing through turbomachine 10 may be conducted into inner cooling wall 52 predominantly from suction side outer wall 28. In the case of airfoil 122, heat would be analogously conducted into cooling wall 152 predominantly from suction side outer wall 128. Heat conducted into inner cooling wall 52 is dissipated to cooling fluid flowing through passage 34. Depending upon such factors as the particular turbomachine application and duty cycle, thermal and material properties of the turbomachine and airfoil 22, cooling fluid mass flow, and still other factors known to those skilled in the art, energy flow in airfoil 22 may typically be such that heat is conducted from outer wall 28 into inner cooling wall 52, and then from inner cooling wall 52 into the cooling fluid conveyed through passage 34. In some instances, a cooling surface area of inner cooling wall 52 may be three times the surface area of the external hot surface of suction side outer wall 28 that is to be conductively cooled. Some heat conduction back into cooling fluid conveyed through passage 62 could also occur, or still other patterns of energy flow could emerge. Heat will also generally be conducted from inner dividing walls 48 and 50 into inner cooling wall 52, and some heat may be conducted from outer wall 28 into inner cooling wall 52, although heat of outer wall 26 will tend to be predominantly dissipated by way of the cooling fluid through passage 34. Spent cooling air is discharged through outlets 42. Those skilled in the art will also appreciate that material thicknesses, surface shapes and textures, cross-sectional areas and still other factors can be tailored to result in various energy flow patterns to suit particular turbomachine cooling applications. As noted above, the present disclosure is contemplated to provide for reduced mass flow and cooling air pressure requirements while also enabling higher cooling effectiveness than many known designs, without any need for film cooling. The designs are also relatively simple and inexpensive to manufacture by way of known casting and machining techniques. While much of the foregoing description focuses on the embodiment of FIGS. 1 and 2, it should be appreciated the description generally applies also to the embodiment of FIG. 3.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon examination of the attached drawings and appended claims.

What is claimed is:

1. An airfoil for a turbomachine comprising:
    an elongate hollow body including an outer body wall having a pressure side and a suction side extending between a leading edge and a trailing edge, and a plurality of inner walls including a flow-distributing forward wall and an inner cooling wall;
    the elongate hollow body having formed therein a forward cavity defined in part by the flow-distributing forward wall and in part by the outer body wall, a switchbacked passage extending between an inlet and a plurality of outlets for conveying a cooling fluid through the airfoil, and a second passage defined in part by the inner cooling wall and in part by the outer body wall;
    a plurality of jetting orifices formed within the flow-distributing forward wall and defined by the outer body wall, and fluidly connecting the switchbacked passage to the forward cavity, and oriented to produce wall jets of incoming cooling fluid from the switchbacked passage directed in an upstream direction toward a back side surface of the leading edge;
    the back side surface of the leading edge defining an arc, and the plurality of jetting orifices being directly adjacent to the outer body wall and oriented such that the plurality of wall jets are directed along a trajectory of the arc; and
    the second passage extending between the forward cavity and the plurality of outlets, so as to convey outgoing cooling fluid from the forward cavity in a downstream direction toward the plurality of outlets.

2. The airfoil of claim 1 wherein the outer body wall includes a suction side inner surface exposed to a flow of the outgoing cooling fluid through the second passage.

3. The airfoil of claim 2 further comprising a set of heat conductors positioned at least partially within the second passage and conductively coupling the inner cooling wall to the outer body wall.

4. The airfoil of claim 3 wherein the switchbacked passage has an incoming segment, and an outgoing segment fluidly connected with the second passage within the elongate hollow body.

5. The airfoil of claim 4 wherein the set of heat conductors is a first set of heat conductors, and further comprising a second set of heat conductors positioned at least partially within the outgoing segment and conductively coupling the inner cooling wall to the outer body wall, and such that the inner cooling wall is supported between the pressure side and the suction side by way of the first and second sets of heat conductors.

6. The airfoil of claim 1 wherein the switchbacked passage has a serpentine form.

7. The airfoil of claim 1 wherein the plurality of jetting orifices each have a length extending between the switchbacked passage and the forward cavity, a width, and a height, and the length is greater than either of the width or the height.

8. The airfoil of claim 7 wherein the forward cavity has a generally circular profile such that the arc is a circular arc.

9. The airfoil of claim 7 wherein the forward cavity has a generally parabolic profile such that the arc is a parabolic arc.

10. The airfoil of claim 9 further comprising a set of pin fin heat conductors positioned at least partially within the second passage and conductively coupling the inner cooling wall to the outer body wall, and a plurality of ribs having streamwise orientations and extending between the forward wall and the outer body wall.

11. A turbomachine comprising:
    a housing having a housing inlet and a housing outlet;
    an airfoil within the housing and positioned in a flow path of fluid conveyed through the housing between the housing inlet and the housing outlet, the airfoil including an outer body wall having a pressure side and a suction side extending between a leading edge and a trailing edge, and a plurality of inner walls including a flow-distributing forward wall and an inner cooling wall;

the airfoil including a forward cavity defined in part by the flow-distributing forward wall and in part by the outer body wall, a switchbacked passage extending between an inlet and a plurality of outlets, and a second passage defined in part by the inner cooling wall and in part by the outer body wall;

a plurality of jetting orifices formed within the flow-distributing forward wall and defined by the outer body wall, and fluidly connecting the switchbacked passage to the forward cavity, and oriented to produce wall jets of incoming cooling fluid from the switchbacked passage directed in an upstream direction toward a back side surface of the leading edge, the plurality of jetting orifices being located directly adjacent to the outer body wall; and the second passage extending between the forward cavity and the plurality of outlets and fluidly connecting with the switchbacked passage within the elongate hollow body, such that a flow of outgoing cooling fluid from the forward cavity and a flow of outgoing cooling fluid from the switchbacked passage are conveyed in a downstream direction through the airfoil toward the plurality of outlets and merged prior to discharging through the plurality of outlets.

12. The turbomachine of claim 11 wherein the back side surface of the leading edge has an arcuate profile, and the jetting orifices are oriented so as to produce wall jets directed along a trajectory of an arc defined by the arcuate profile.

13. The turbomachine of claim 12 wherein the inner cooling wall is positioned adjacent to the suction side of the airfoil and an inner surface of the airfoil on the suction side is exposed to a flow of cooling fluid through the second passage.

14. The turbomachine of claim 13 further comprising a set of heat conductors positioned at least partially within the second passage and thermally coupling the inner cooling wall to the outer body wall.

15. The turbomachine of claim 11 wherein the back side surface of the leading edge has a generally circular profile.

16. The turbomachine of claim 11 wherein the switchbacked passage includes an incoming segment, an outgoing segment, and a middle segment so as to have a serpentine form.

17. The turbomachine of claim 11 wherein the airfoil includes a confluence of the switchbacked passage and the second passage, and the confluence is formed in part by a back edge of the inner cooling wall.

18. A method of cooling an airfoil comprising:
conveying a cooling fluid from a switchbacked passage extending through the airfoil into a plurality of jetting orifices formed within a flow-distributing forward wall and defined by an outer body wall of the airfoil, the plurality of jetting orifices fluidly connecting the switchbacked passage with a forward cavity positioned adjacent to a leading edge of the airfoil and being located directly adjacent to an outer body wall of the airfoil;

directing jets of the cooling fluid produced by the jetting orifices in an upstream direction along a back side surface of the leading edge so as to dissipate heat of the leading edge; and directing the cooling fluid having dissipated heat of the leading edge in a downstream direction through a second passage defined by an outer body wall and an inner cooling wall of the airfoil, such that the cooling fluid dissipates heat of the outer body wall prior to discharging through a plurality of outlets.

19. The method of claim 18 wherein the directing of the jets includes directing the jets along a path coinciding with a trajectory of an arc defined by an arcuate profile of the back side inner surface.

* * * * *